US011958173B2

(12) United States Patent
Ueda et al.

(10) Patent No.: US 11,958,173 B2
(45) Date of Patent: Apr. 16, 2024

(54) IMPACT TOOL, METHOD FOR CONTROLLING THE IMPACT TOOL, AND PROGRAM

(71) Applicant: Panasonic Intellectual Property Management Co., Ltd., Osaka (JP)

(72) Inventors: Takahiro Ueda, Osaka (JP); Masayuki Nakahara, Osaka (JP); Takashi Kusagawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 49 days.

(21) Appl. No.: 17/774,027

(22) PCT Filed: Oct. 14, 2020

(86) PCT No.: PCT/JP2020/038840
§ 371 (c)(1),
(2) Date: May 3, 2022

(87) PCT Pub. No.: WO2021/095427
PCT Pub. Date: May 20, 2021

(65) Prior Publication Data

US 2023/0001548 A1 Jan. 5, 2023

(30) Foreign Application Priority Data

Nov. 15, 2019 (JP) ................................ 2019-207501

(51) Int. Cl.
*B25B 23/147* (2006.01)
*B25B 21/02* (2006.01)

(52) U.S. Cl.
CPC .......... *B25B 23/1475* (2013.01); *B25B 21/02* (2013.01)

(58) Field of Classification Search
CPC ............................ B25B 23/1475; B25B 21/02
(Continued)

(56) References Cited

U.S. PATENT DOCUMENTS 3,643,749 A * 2/1972 Pauley ................ B25B 23/1453 81/464
3,924,330 A * 12/1975 Mitsuhashi .......... B65H 3/0883 30/362
(Continued)

FOREIGN PATENT DOCUMENTS

JP H10-328952 A 12/1998
JP 2010-207951 A 9/2010
(Continued)

OTHER PUBLICATIONS

International Search Report dated Dec. 28, 2020 issued in International Patent Application No. PCT/JP2020/038840, with English translation.
(Continued)

*Primary Examiner* — Dariush Seif
(74) *Attorney, Agent, or Firm* — Rimon P.C.

(57) ABSTRACT

An impact tool includes a motor, a control unit, an output shaft, a transmission mechanism, and an impact detection unit. The transmission mechanism includes an impact mechanism. The impact mechanism applies impacting force to the output shaft while performing an impact operation. The impact detection unit determines, based on at least one of an excitation current (current measured value) to be supplied to the motor or a torque current (current measured value) to be supplied to the motor, whether or not the impact operation is being performed. The control unit places a limit on an increase in the number of revolutions of the motor before the impact detection unit detects the impact operation and removes the limit on the increase in the number of
(Continued)

revolutions of the motor when the impact detection unit detects the impact operation.

9 Claims, 6 Drawing Sheets

(58) Field of Classification Search
USPC ........................................................ 173/176
See application file for complete search history.

(56) References Cited

U.S. PATENT DOCUMENTS 3,979,944 A * 9/1976 Salmi ...................... E21B 44/06 173/8
4,023,626 A * 5/1977 Salmi ...................... B25D 9/12 173/8
4,100,977 A * 7/1978 Elliott .................. F03C 1/0135 173/127
5,154,242 A * 10/1992 Soshin .................. B25B 23/147 173/180
5,353,882 A * 10/1994 Inoue .................... B25B 23/147 173/176
5,490,421 A * 2/1996 Ueyanagi ................ G01P 1/006 73/514.33
5,544,710 A * 8/1996 Groshans ................ B25B 21/02 173/176
5,992,536 A * 11/1999 Shimada ................. B30B 15/16 173/15
6,883,617 B2 * 4/2005 Putney ................ B25B 23/1456 173/90
6,923,269 B2 * 8/2005 Berger ................. B25D 17/086 173/90
7,227,330 B2 * 6/2007 Swamy ..................... H02P 3/18 187/296
7,334,648 B2 * 2/2008 Arimura ............. B25B 23/1405 173/179
7,428,934 B2 * 9/2008 Arimura ............. B25B 23/1475 173/104
7,464,591 B2 * 12/2008 Fukuda ................... G01P 15/08 73/514.36
7,839,112 B2 * 11/2010 Wei ......................... H02P 7/295 318/434
8,698,447 B2 * 4/2014 Lumsden ................ H02P 6/182 318/400.14
8,796,976 B2 * 8/2014 Kusakawa ............ B25B 23/147 318/434
9,013,130 B2 * 4/2015 Chen ....................... H02P 23/14 318/432
9,296,095 B2 * 3/2016 Yoshino .................. B25F 5/001
9,555,525 B2 * 1/2017 Wu ......................... B25B 21/02
9,573,254 B2 * 2/2017 Bartoszek ............... B25B 21/02
9,950,417 B2 * 4/2018 Ito .......................... B25F 5/021
10,272,550 B2 * 4/2019 Dey, IV .................. B25B 21/02
10,307,899 B2 * 6/2019 Hu .......................... B25B 21/02
10,343,268 B2 * 7/2019 Hirabayashi ............ B25B 21/02
10,383,674 B2 * 8/2019 Sexson .................. A61B 90/03
10,493,614 B2 * 12/2019 Tsutsui .................. G01L 1/2281
10,505,473 B2 * 12/2019 Takano ................... H02P 27/08
10,603,050 B2 * 3/2020 Pedicini ............. A61B 17/1604
10,603,770 B2 * 3/2020 Huber ..................... B25B 21/02
10,615,670 B2 * 4/2020 Madineni .................. B25F 5/02
10,919,134 B2 * 2/2021 Miyazaki .................. B25F 5/00
10,926,386 B2 * 2/2021 Oishi ...................... B25B 21/02
10,953,524 B2 * 3/2021 Sako ....................... B25B 21/02
10,987,784 B2 * 4/2021 Seith ....................... B25B 21/02
10,994,393 B2 * 5/2021 Harada ................. B25B 21/023
11,207,763 B2 * 12/2021 Tanji ....................... B25B 21/02
11,235,453 B2 * 2/2022 Ichikawa ............ B25B 23/1475
11,247,321 B2 * 2/2022 Cooper ................. B25B 21/026
11,247,323 B2 * 2/2022 Kumagai ............ B25B 23/1475
11,325,228 B2 * 5/2022 Osada ................. B25B 23/1475
11,426,848 B2 * 8/2022 Alberding ............... B25B 21/02
11,491,616 B2 * 11/2022 Ely ....................... B25B 21/008
11,491,617 B2 * 11/2022 Leong ....................... B25F 5/00
2001/0010267 A1 * 8/2001 Kawarai ............. B25B 23/1453 173/180
2002/0134172 A1 * 9/2002 Yamada .............. B25B 23/1405 73/862.21
2005/0109519 A1 * 5/2005 Kawai ................. B25B 23/1405 173/183
2007/0013338 A1 1/2007 Swamy et al.
2007/0145925 A1 * 6/2007 DeCicco .................. H02P 7/29 318/432
2011/0315417 A1 * 12/2011 Matsunaga ........... B25B 21/008 173/176
2012/0199372 A1 * 8/2012 Nishikawa ............. B25B 21/02 173/132
2012/0234566 A1 * 9/2012 Mashiko ................. B25B 21/02 173/93.5
2012/0255756 A1 * 10/2012 Aoki ....................... B24B 47/26 173/181
2012/0279736 A1 * 11/2012 Tanimoto ............. B25B 21/026 173/117
2012/0292065 A1 * 11/2012 Hoshi ..................... B25B 21/02 173/93
2012/0292070 A1 * 11/2012 Ito ......................... H02K 11/33 173/217
2012/0318550 A1 * 12/2012 Tanimoto ............ B25B 23/1475 173/117
2013/0008679 A1 * 1/2013 Nishikawa ............. B25B 21/02 173/93
2013/0014967 A1 * 1/2013 Ito ............................ B25F 5/00 173/93
2013/0025892 A1 * 1/2013 Mashiko ............... B25B 21/026 173/2
2013/0133911 A1 * 5/2013 Ishikawa ............... B25B 21/026 173/176
2013/0133912 A1 * 5/2013 Mizuno ............... B25B 23/1405 173/180
2013/0186661 A1 * 7/2013 Okubo ...................... B25F 5/00 173/2
2013/0294001 A1 * 11/2013 Moriguchi ............ B60K 28/00 361/179
2014/0158390 A1 * 6/2014 Mashiko ............... B25B 23/147 173/217
2015/0021062 A1 * 1/2015 Sekino .................... B25B 23/14 173/183
2015/0042246 A1 * 2/2015 Tadokoro .................. H02P 6/34 318/114
2015/0047866 A1 * 2/2015 Sakai ...................... B25B 21/02 173/217
2015/0122521 A1 * 5/2015 Chen ....................... B25B 21/02 173/1
2015/0122525 A1 * 5/2015 Wei ..................... B25B 23/1405 173/179
2015/0144365 A1 * 5/2015 Hirabayashi ........ B25B 23/1405 173/2
2015/0165604 A1 * 6/2015 Bartoszek ............... B25B 21/02 173/1
2015/0231770 A1 * 8/2015 Kusakawa .......... B25B 23/1475 173/93.5
2015/0231771 A1 * 8/2015 Sakai ...................... B25B 21/02 173/176
2015/0337521 A1 * 11/2015 Sakamoto ............. B60W 10/30 903/930
2015/0372633 A1 * 12/2015 Machida ................ B25D 16/00 173/48
2016/0079887 A1 * 3/2016 Takano ................... H02P 1/028 318/431
2016/0107297 A1 * 4/2016 Ishikawa ................. B25B 23/18 173/179
2016/0121467 A1 * 5/2016 Ng ...................... B25B 23/1475 81/464
2016/0121470 A1 * 5/2016 Mayer ................. B25B 23/1475 173/2
2016/0190965 A1 * 6/2016 Miyazaki .................. H02P 1/00 318/14
2016/0325414 A1 * 11/2016 Mizuno ............... B25B 23/1453
2017/0008156 A1 * 1/2017 Miyazaki ............ B25B 23/1475

(56) References Cited

U.S. PATENT DOCUMENTS

| | | | | |
|---|---|---|---|---|
| 2017/0036327 | A1* | 2/2017 | Murakami | B25F 5/006 |
| 2017/0057064 | A1* | 3/2017 | Ishikawa | B25B 23/1475 |
| 2017/0144278 | A1* | 5/2017 | Nishikawa | B25B 21/026 |
| 2017/0151657 | A1* | 6/2017 | Nagasaka | H01H 13/08 |
| 2017/0173768 | A1* | 6/2017 | Dey, IV | B25B 21/02 |
| 2017/0190032 | A1* | 7/2017 | Leong | B25B 23/1475 |
| 2017/0217001 | A1* | 8/2017 | Oishi | B25B 21/02 |
| 2017/0246732 | A1* | 8/2017 | Dey, IV | B25B 23/1475 |
| 2018/0117745 | A1* | 5/2018 | Murakami | B25D 11/04 |
| 2018/0200872 | A1* | 7/2018 | Leong | B25B 21/002 |
| 2018/0272511 | A1* | 9/2018 | Sako | B25B 23/1405 |
| 2019/0022836 | A1* | 1/2019 | Chu | G01L 25/003 |
| 2019/0030696 | A1* | 1/2019 | Seith | B25B 21/02 |
| 2019/0047131 | A1* | 2/2019 | Ichikawa | B25B 21/02 |
| 2019/0118353 | A1* | 4/2019 | Woetzl | B25B 23/1475 |
| 2019/0321949 | A1* | 10/2019 | Miyazaki | G05B 19/182 |
| 2019/0321958 | A1* | 10/2019 | Cooper | B25B 21/026 |
| 2020/0078919 | A1* | 3/2020 | Machida | B25D 17/043 |
| 2020/0130153 | A1* | 4/2020 | Yoneda | B25B 23/147 |
| 2020/0324397 | A1* | 10/2020 | Brunner | B23P 19/066 |
| 2020/0361064 | A1* | 11/2020 | Gaul | B25B 21/02 |
| 2020/0384618 | A1* | 12/2020 | Tanji | B25B 21/02 |
| 2020/0384620 | A1* | 12/2020 | Gaul | B25B 31/00 |
| 2021/0053196 | A1* | 2/2021 | Tanji | B25B 21/02 |

FOREIGN PATENT DOCUMENTS

| | | | |
|---|---|---|---|
| JP | 2016-078230 | A | 5/2016 |
| JP | 2017-132021 | A | 8/2017 |
| JP | 2017-189067 | A | 10/2017 |
| JP | 2019-030948 | A | 2/2019 |
| WO | 2018/230141 | A1 | 12/2018 |

OTHER PUBLICATIONS

International Search Report dated Dec. 28, 2020 issued in International Patent Application No. PCT/JP2020/038841, with English translation.

Non-Final Office Action dated Feb. 22, 2024 issued in U.S. Appl. No. 17/774,014.

* cited by examiner

IMPACT TOOL, METHOD FOR CONTROLLING THE IMPACT TOOL, AND PROGRAM

CROSS-REFERENCE OF RELATED APPLICATIONS

This application is the U.S. National Phase under 35 U.S.C. § 371 of International Patent Application No. PCT/JP2020/038840, filed on Oct. 14, 2020, which in turn claims the benefit of Japanese Patent Application No. 2019-207501, filed on Nov. 15, 2019, the entire disclosures of which Applications are incorporated by reference herein.

TECHNICAL FIELD

The present disclosure generally relates to an impact tool, a method for controlling the impact tool, and a program. More particularly, the present disclosure relates to an impact tool including a motor to be subjected to vector control, a method for controlling the impact tool, and a program for performing the control method.

BACKGROUND ART

Patent Literature 1 discloses an impact rotary tool (impact tool) including a motor, an impact mechanism, an output shaft, a control unit, trigger switch, and a motor driving unit. The impact mechanism includes a hammer and applies impacting force to the output shaft with the output of the motor, thus allowing the impact rotary tool to tighten a screw. The control unit gives a driving instruction according to a manipulative variable of the trigger switch to the motor driving unit. In accordance with the driving instruction given by the control unit, the motor driving unit regulates the voltage applied to the motor, thereby adjusting the number of revolutions of the motor.

In the impact rotary tool of Patent Literature 1, control of the number of revolutions of the motor at the time of work is up to the user's operation on the trigger switch. Thus, an unskilled user sometimes cannot have the work done as efficiently as a skilled user.

CITATION LIST

Patent Literature

Patent Literature 1: JP 2017-132021 A

SUMMARY OF INVENTION

An object of the present disclosure is to provide an impact tool, a method for controlling the impact tool, and a program, all of which contribute to improving the work efficiency.

An impact tool according to an aspect of the present disclosure includes a motor, a control unit, an output shaft, a transmission mechanism, and an impact detection unit. The control unit performs vector control on the motor. The output shaft is to be coupled to a tip tool. The transmission mechanism transmits motive power of the motor to the output shaft. The transmission mechanism includes an impact mechanism. The impact mechanism performs an impact operation according to magnitude of torque applied to the output shaft. The impact mechanism applies impacting force to the output shaft while performing the impact operation. The impact detection unit determines, based on at least one of an excitation current to be supplied to the motor or a torque current to be supplied to the motor, whether or not the impact operation is being performed. The control unit places a limit on an increase in a number of revolutions of the motor before the impact detection unit detects the impact operation and removes the limit on the increase in the number of revolutions of the motor when the impact detection unit detects the impact operation.

A method for controlling an impact tool according to another aspect of the present disclosure is a method for controlling an impact tool including a motor, a control unit, an output shaft, and a transmission mechanism. The control unit performs vector control on the motor. The output shaft is to be coupled to a tip tool. The transmission mechanism transmits motive power of the motor to the output shaft. The transmission mechanism includes an impact mechanism. The impact mechanism performs an impact operation according to magnitude of torque applied to the output shaft. The impact mechanism applies impacting force to the output shaft while performing the impact operation. The method for controlling the impact tool includes impact detection processing, a first control, and a second control. The impact detection processing includes determining, based on at least one of an excitation current to be supplied to the motor or a torque current to be supplied to the motor, whether or not the impact operation is being performed. The first control includes placing a limit on an increase in a number of revolutions of the motor before the impact operation is detected in the impact detection processing. The second control includes removing the limit on the increase in the number of revolutions of the motor when the impact operation is detected in the impact detection processing.

A program according to still another aspect of the present disclosure is designed to cause one or more processors to perform the method for controlling the impact tool described above.

DESCRIPTION OF EMBODIMENTS

Embodiments of an impact tool 1 will now be described with reference to the accompanying drawings. Note that the embodiment to be described below is only an exemplary one of various embodiments of the present disclosure and should not be construed as limiting. Rather, the exemplary embodiment may be readily modified in various manners depending on a design choice or any other factor without departing from the scope of the present disclosure. Also, the drawings to be referred to in the following description of embodiments are schematic representations. That is to say, the ratio of the dimensions (including thicknesses) of respective constituent elements illustrated on the drawings does not always reflect their actual dimensional ratio.

(1) Overview

Figure 1:
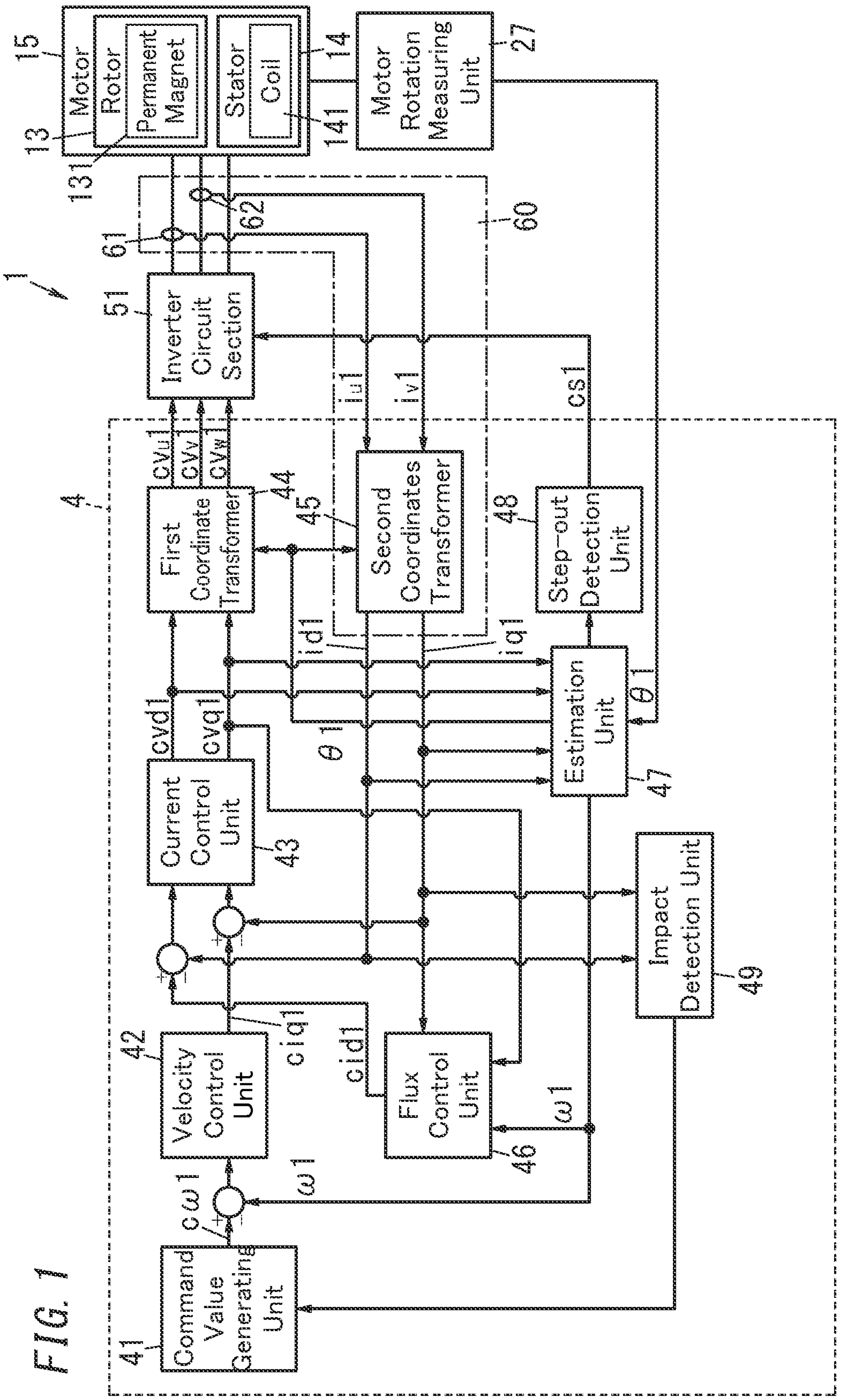
FIG. 1 is a block diagram of an impact tool according to an exemplary embodiment.
Figure 2:
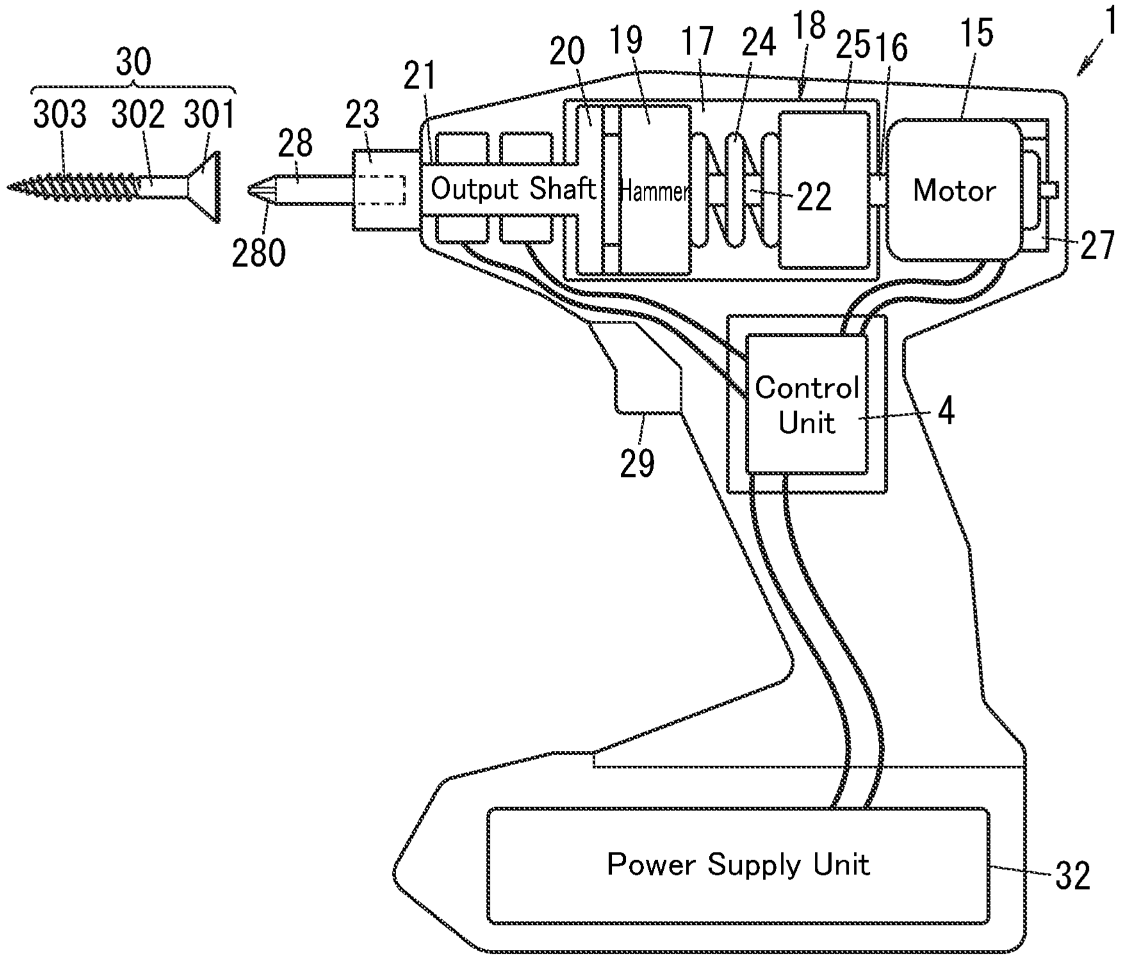
FIG. 2 is a schematic representation of the impact tool.

The impact tool 1 (see FIG. 2) may be used as, for example, an impact screwdriver, a hammer drill, an impact drill, an impact drill-screwdriver, or an impact wrench. In the following description of an exemplary embodiment, a situation where the impact tool 1 is used as an impact screwdriver for fastening a screw will be described as a typical application. As shown in FIGS. 1 and 2, the impact tool 1 includes a motor 15, a control unit 4, an output shaft 21, a transmission mechanism 18, and an impact detection unit 49. The control unit 4 performs vector control on the motor 15. The output shaft 21 is to be coupled to a tip tool 28. The transmission mechanism 18 transmits motive power of the motor 15 to the output shaft 21. The transmission mechanism 18 includes an impact mechanism 17. The impact mechanism 17 performs an impact operation according to the magnitude of torque applied to the output shaft 21. The impact mechanism 17 applies impacting force to the output shaft 21 while performing the impact operation. The impact detection unit 49 determines, based on at least one of an excitation current (current measured value id1) to be supplied to the motor 15 or a torque current (current measured value iq1) to be supplied to the motor 15, whether or not the impact operation is being performed. The control unit 4 places a limit on an increase in the number N1 of revolutions (see FIG. 4) of the motor 15 before the impact detection unit 49 detects the impact operation and removes the limit on the increase in the number N1 of revolutions of the motor 15 when the impact detection unit 49 detects the impact operation.

In the impact tool 1 according to this embodiment, a limit is placed on an increase in the number N1 of revolutions of the motor 15 before the impact mechanism 17 starts performing the impact operation, thus reducing the chances of a work target such as a screw being tilted with respect to a workpiece such as a wall due to an excessive number N1 of revolutions and thereby improving the work efficiency. In addition, this also allows the number N1 of revolutions of the motor 15 to be increased once the impact mechanism 17 has started performing the impact operation, thus contributing to improving the work efficiency compared to a situation where the number N1 of revolutions cannot be increased.

Also, in a situation where at the beginning of an impact operation, a user attempts to increase the number N1 of revolutions of the motor 15 by operating the trigger switch 29 without depending on the control by the control unit 4, if he or she lacks skills in operating the trigger switch 29, then he or she may be unable to increase the number N1 of revolutions of the motor 15 to an appropriate level. In contrast, according to this embodiment, the control unit 4 removes the limit on the increase in the number N1 of revolutions of the motor 15 after the impact operation has started to be performed, thus making the number N1 of revolutions controllable without depending on the user's skills.

The motor 15 may be a brushless motor. In particular, the motor 15 according to this embodiment is a synchronous motor. More specifically, the motor 15 may be a permanent magnet synchronous motor (PMSM). The motor 15 includes a rotor 13 having a permanent magnet 131 and a stator 14 having a coil 141. The rotor 13 includes a rotary shaft 16 which outputs rotational power. The rotor 13 rotates with respect to the stator 14 due to electromagnetic interaction between the coil 141 and the permanent magnet 131.

The vector control is a type of motor control method in which a current supplied to the coil 141 of the motor 15 is broken down into a current component (excitation current) that generates a magnetic flux and a current component (torque current) that generates a torque (rotational power) and in which these current components are controlled independently of each other.

At least one of the current measured values id1, iq1 is used for both purposes of performing the vector control and determining whether or not any impact operation is being performed. This allows a part of a circuit for performing the vector control and a part of a circuit for determining whether or not any impact operation is being performed to be shared. This contributes to reducing the areas and dimensions of circuits provided for the impact tool 1 and cutting down the cost required for the circuits. In addition, this also improves the accuracy of detection compared to, for example, a situation where a measured value of the output current of the power supply unit 32 of the impact tool 1 is used to determine whether or not any impact operation is being performed.

(2) Impact Tool

As shown in FIG. 2, the impact tool 1 includes a power supply unit 32, the motor 15, a motor rotation measuring unit 27, the transmission mechanism 18, the output shaft 21, a socket 23, and the tip tool 28. In addition, the impact tool 1 further includes a trigger switch 29 and the control unit 4. The control unit 4 includes the impact detection unit 49 for determining whether or not the impact mechanism 17 is performing any impact operation.

The output shaft 21 is a part that rotates upon receiving the driving force transmitted from the motor 15 via the transmission mechanism 18. The socket 23 is fixed to the output shaft 21. The tip tool 28 is attached removably to the socket 23. The tip tool 28 rotates along with the output shaft 21. The impact tool 1 is designed to rotate the tip tool 28 by turning the output shaft 21 with the driving force applied by the motor 15. That is to say, the impact tool 1 is a tool for driving the tip tool 28 with the driving force applied by the motor 15. The tip tool 28 (also called a "bit") may be a screwdriver bit or a drill bit, for example. One of various types of tip tools 28 is selected depending on the intended use and attached to the socket 23 for the intended use. Alternatively, the tip tool 28 may be directly attached to the output shaft 21.

The impact tool 1 according to this embodiment includes the socket 23, thus making the tip tool 28 replaceable depending on the intended use. However, the tip tool 28 does not have to be replaceable. Alternatively, the impact tool 1 may also be an impact tool designed to allow the use of only a particular type of tip tool 28, for example.

The tip tool 28 according to this embodiment is a screwdriver bit for tightening or loosening a fastening member 30 (screw). More specifically, the tip tool 28 is a plus screwdriver bit, of which a tip portion 280 is formed in a + (plus) shape. That is to say, the output shaft 21 holds the screwdriver bit for tightening or loosening a screw and rotates upon receiving motive power from the motor 15. In the following description, a situation where the screw is tightened by the impact tool 1 will be described as an example. Note that any type of screw may be used without limitation. The screw may be a bolt, a screw, or a nut, for example. If the operation mode of the control unit 4 is the first mode (to be described later), a wood screw is particularly suitably used as the fastening member 30. In the first mode, the control unit 4 places a limit on the increase in the number N1 of revolutions of the motor 15 before the impact detection unit 49 detects any impact operation. As shown in FIG. 2, the fastening member 30 according to this embodiment is a wood screw. The fastening member 30 includes a head portion 301, a cylindrical portion 302, and a thread portion 303. The head portion 301 is connected to a first end of the cylindrical portion 302. The thread portion 303 is connected to a second end of the cylindrical portion 302. The head portion 301 has a screw hole (such as a plus (+) hole) that fits the tip tool 28. The thread portion 303 has a thread thereon.

The tip tool 28 fits the fastening member 30. That is to say, the tip tool 28 is inserted into the screw hole on the head portion 301 of the fastening member 30. In this state, the tip tool 28 is caused to rotate by being driven by the motor 15, thereby turning the fastening member 30. In this manner, the fastening member 30 (wood screw) is screwed into a target member (such as a wall member) of screwing while forming a hole and a thread groove in the workpiece of screwing. That is to say, the tip tool 28 applies tightening (or loosening) force to the fastening member 30.

The power supply unit 32 supplies a current for driving the motor 15. The power supply unit 32 may be a battery pack, for example. The power supply unit 32 may include, for example, either a single secondary battery or a plurality of secondary batteries.

The transmission mechanism 18 includes a planetary gear mechanism 25, a drive shaft 22, and the impact mechanism 17. The transmission mechanism 18 transmits the rotational power of the rotary shaft 16 of the motor 15 to the output shaft 21. More specifically, the transmission mechanism 18 regulates the rotational power of the rotary shaft 16 of the motor 15 and outputs the rotational power thus regulated as the rotational power of the output shaft 21.

The rotary shaft 16 of the motor 15 is connected to the planetary gear mechanism 25. The drive shaft 22 is connected to the planetary gear mechanism 25 and the impact mechanism 17. The planetary gear mechanism 25 reduces the rotational power of the rotary shaft 16 of the motor 15 at a predetermined reduction ratio and outputs the rotational power thus reduced as the rotational power of the drive shaft 22.

The impact mechanism 17 is coupled to the output shaft 21. The impact mechanism 17 transmits the rotational power (of the rotary shaft 16) of the motor 15, which has been received via the planetary gear mechanism 25 and the drive shaft 22, to the output shaft 21. In addition, the impact mechanism 17 also performs an impact operation of applying impacting force to the output shaft 21.

The impact mechanism 17 includes a hammer 19, an anvil 20, and a spring 24. The hammer 19 is attached to the drive shaft 22 via a cam mechanism. The anvil 20 is in contact with, and rotates along with, the hammer 19. The spring 24 biases the hammer 19 toward the anvil 20. The anvil 20 is formed integrally with the output shaft 21. Alternatively, the anvil 20 may also be formed separately from, and be fixed to, the output shaft 21.

Unless a load (torque) with a predetermined magnitude or more is applied to the output shaft 21, the impact mechanism 17 causes the output shaft 21 to turn continuously with the rotational power of the motor 15. That is to say, in that case, the drive shaft 22 and the hammer 19 that are coupled to each other via the cam mechanism rotate along with each other and the hammer 19 and the anvil 20 also rotate with each other. Thus, the output shaft 21 formed integrally with the anvil 20 rotates.

On the other hand, upon the application of a load with the predetermined magnitude or more to the output shaft 21, the impact mechanism 17 performs an impact operation. In performing the impact operation, the impact mechanism 17 generates impacting force by transforming the rotational power of the motor 15 into pulses of torque. That is to say, while the impact operation is being performed, the hammer 19 retreats by overcoming the biasing force applied by the spring 24 (i.e., goes away from the anvil 20) while being regulated by the cam mechanism between the drive shaft 22 and the hammer 19 itself. At a point in time when the hammer 19 retreats to be decoupled from the anvil 20, the hammer 19 starts advancing (i.e., toward the output shaft 21) while rotating, thereby applying impacting force to the anvil 20 in the rotational direction and causing the output shaft 21 to rotate. That is to say, the impact mechanism 17 applies rotational impact around the axis (output shaft 21) to the output shaft 21 via the anvil 20. While the impact mechanism 17 is performing the impact operation, the hammer 19 repeatedly performs the operation of applying impacting force to the anvil 20 in the rotational direction. Every time the hammer 19 advances and retreats, the impacting force is generated once.

The trigger switch 29 is an operating member for accepting the operation of controlling the rotation of the motor 15. The motor 15 may be selectively activated (turned ON or OFF) by the operation of pulling the trigger switch 29. In addition, the rotational velocity of the motor 15 is adjustable depending on the manipulative variable of the operation of pulling the trigger switch 29 (i.e., depending on how deep the trigger switch 29 is pulled). As a result, the rotational velocity of the output shaft 21 is adjustable depending on the manipulative variable of the operation of pulling the trigger switch 29. The greater the manipulative variable is, the higher the rotational velocity of the motor 15 and the output shaft 21 becomes. The control unit 4 either starts or stops rotating the motor 15 and the output shaft 21, and controls the rotational velocity of the motor 15 and the output shaft 21, depending on the manipulative variable of the operation of pulling the trigger switch 29. In this impact tool 1, the tip tool 28 is coupled to the output shaft 21 via the socket 23. In addition, the rotational velocity of the motor 15 and the output shaft 21 is controlled by operating the trigger switch 29, thereby controlling the rotational velocity of the tip tool 28.

The motor rotation measuring unit 27 measures the rotational angle of the motor 15. As the motor rotation measuring unit 27, a photoelectric encoder or a magnetic encoder may be adopted, for example.

The impact tool 1 includes an inverter circuit section 51 (see FIG. 1). The inverter circuit section 51 supplies an electric current to the motor 15. The control unit 4 is used along with the inverter circuit section 51 to control the operation of the motor 15 by feedback control.

(3) Control Unit

The control unit 4 includes a computer system including one or more processors and a memory. At least some of the functions of the control unit 4 are performed by making the processor(s) of the computer system execute a program stored in the memory of the computer system. The program may be stored in the memory. The program may also be downloaded via a telecommunications line such as the Internet or distributed after having been stored in a non-transitory storage medium such as a memory card.

As shown in FIG. 1, the control unit 4 includes a command value generating unit 41, a velocity control unit 42, a current control unit 43, a first coordinate transformer 44, a second coordinate transformer 45, a flux control unit 46, an estimation unit 47, a step-out detection unit 48, and the impact detection unit 49. The impact tool 1 further includes a plurality of (e.g., two in the example illustrated in FIG. 1) current sensors 61, 62.

Each of the plurality of current sensors 61, 62 includes, for example, a hall element current sensor or a shunt resistor element. The plurality of current sensors 61, 62 measure an electric current supplied from the power supply unit 32 (see FIG. 2) to the motor 15 via the inverter circuit section 51. In this embodiment, three-phase currents (namely, a U-phase current, a V-phase current, and a W-phase current) are supplied to the motor 15. The plurality of current sensors 61, 62 measure currents in at least two phases. In FIG. 1, the current sensor 61 measures the U-phase current to output a current measured value $i_u$1 and the current sensor 62 measures the V-phase current to output a current measured value $i_v$1.

The estimation unit 47 obtains a time derivative of the rotational angle θ1, measured by the motor rotation measuring unit 27, of the motor 15 to calculate an angular velocity ω1 of the motor 15 (i.e., the angular velocity of the rotary shaft 16).

An acquisition unit 60 is made up of the two current sensors 61, 62 and the second coordinate transformer 45. The acquisition unit 60 acquires a d-axis current (excitation current) and a q-axis current (torque current), both of which are to be supplied to the motor 15. That is to say, the current measured value id1 of the d-axis current and the current measured value iq1 of the q-axis current are calculated by having two-phase currents measured by the two current sensors 61, 62 transformed by the second coordinate transformer 45.

The second coordinate transformer 45 performs, based on the rotational angle θ1, measured by the motor rotation measuring unit 27, of the motor 15, coordinate transformation on the current measured values $i_u$1, $i_v$1 measured by the plurality of current sensors 61, 62, thereby calculating current measured values id1, iq1. That is to say, the second coordinate transformer 45 transforms the current measured values $i_u$1, $i_v$1, corresponding to currents in two out of three phases, into a current measured value id1 corresponding to a magnetic field component (d-axis current) and a current measured value iq1 corresponding to a torque component (q-axis current).

The command value generating unit 41 generates a command value cω1 for the angular velocity of the motor 15. The command value generating unit 41 may generate, for example, a command value cω1 representing a manipulative variable that indicates how deep the trigger switch 29 (see FIG. 2) has been pulled. That is to say, as the manipulative variable increases, the command value generating unit 41 increases the command value cω1 of the angular velocity accordingly.

The velocity control unit 42 generates a command value ciq1 based on the difference between the command value cω1 generated by the command value generating unit 41 and the angular velocity col calculated by the estimation unit 47. The command value ciq1 is a command value specifying the magnitude of a torque current (q-axis current) of the motor 15. The velocity control unit 42 determines the command value ciq1 to reduce the difference between the command value cω1 and the angular velocity ciq1. More specifically, the velocity control unit 42 determines the command value ciq1 such that the difference becomes equal to or less than a predetermined first threshold value.

The flux control unit 46 generates a command value cid1 based on the angular velocity col calculated by the estimation unit 47, a command value cvq1 (to be described later) generated by the current control unit 43, and the current measured value iq1. The command value cid1 is a command value that specifies the magnitude of the excitation current (d-axis current) of the motor 15. That is to say, the control unit 4 controls the operation of the motor 15 to bring the excitation current (d-axis current) to be supplied to the coil 141 of the motor 15 closer toward the command value cid1.

In this embodiment, the command value cid1 generated by the flux control unit 46 may be, for example, a command value to set the magnitude of the excitation current at zero. The flux control unit 46 may generate the command value cid1 to set the magnitude of the excitation current at zero constantly or may generate a command value cid1 to set the magnitude of the excitation current at a value greater or smaller than zero only as needed. When the command value cid1 of the excitation current becomes smaller than zero, a negative excitation current (i.e., a flux-weakening current) flows through the motor 15.

The current control unit 43 generates a command value cvd1 based on the difference between the command value cid1 generated by the flux control unit 46 and the current measured value id1 calculated by the second coordinate transformer 45. The command value cvd1 is a command value that specifies the magnitude of d-axis voltage of the motor 15. The current control unit 43 determines the command value cvd1 to reduce the difference between the command value cid1 and the current measured value id1. More specifically, the current control unit 43 determines the command value cvd1 such that the difference becomes equal to or less than a predetermined second threshold value.

In addition, the current control unit 43 also generates a command value cvq1 based on the difference between the command value ciq1 generated by the velocity control unit 42 and the current measured value iq1 calculated by the second coordinate transformer 45. The command value cvq1 is a command value that specifies the magnitude of q-axis voltage of the motor 15. The current control unit 43 generates the command value cvq1 to reduce the difference between the command value ciq1 and the current measured value iq1. More specifically, the current control unit 43 determines the command value cvq1 such that the difference becomes equal to or less than a predetermined third threshold value.

The first coordinate transformer 44 performs coordinate transformation on the command values cvd1, cvq1 based on the rotational angle θ1, measured by the motor rotation measuring unit 27, of the motor 15 to calculate command values $cv_u$1, $cv_v$ 1, $cv_w$ 1. Specifically, the first coordinate transformer 44 transforms the command value cvd1 for a magnetic field component (d-axis voltage) and the command value cvq1 for a torque component (q-axis voltage) into command values $cv_u$1, $cv_v$1, $cv_w$1 corresponding to voltages in three phases. Specifically, the command value $cv_u$1 corresponds to a U-phase voltage, the command value $cv_v$1 corresponds to a V-phase voltage, and the command value $cv_w$1 corresponds to a W-phase voltage.

The control unit 4 controls the power to be supplied to the motor 15 by performing pulse width modulation (PWM) control on the inverter circuit section 51. Thus, the inverter circuit section 51 supplies voltages in three phases, corresponding to the command values $cv_u1$, $cv_v1$, $cv_w1$, respectively, to the motor 15.

The motor 15 is driven with the power (voltages in three phases) supplied from the inverter circuit section 51, thus generating rotational power.

As a result, the control unit 4 controls the excitation current such that the excitation current flowing through the coil 141 of the motor 15 comes to have a magnitude corresponding to the command value cid1 generated by the flux control unit 46. In addition, the control unit 4 also controls the angular velocity of the motor 15 such that the angular velocity of the motor 15 becomes an angular velocity corresponding to the command value cω1 generated by the command value generating unit 41.

The step-out detection unit 48 detects a step-out (loss of synchronism) of the motor 15 based on the current measured values id1, iq1 acquired from the second coordinate transformer 45 and the command values cvd1, cvq1 acquired from the current control unit 43. On detecting the step-out, the step-out detection unit 48 transmits a stop signal cs1 to the inverter circuit section 51, thus having the supply of power from the inverter circuit section 51 to the motor 15 stopped.

The impact detection unit 49 determines whether or not the impact mechanism 17 is performing any impact operation. The impact detection unit 49 will be described in detail later.

(4) Details of Vector Control

Figure 3:
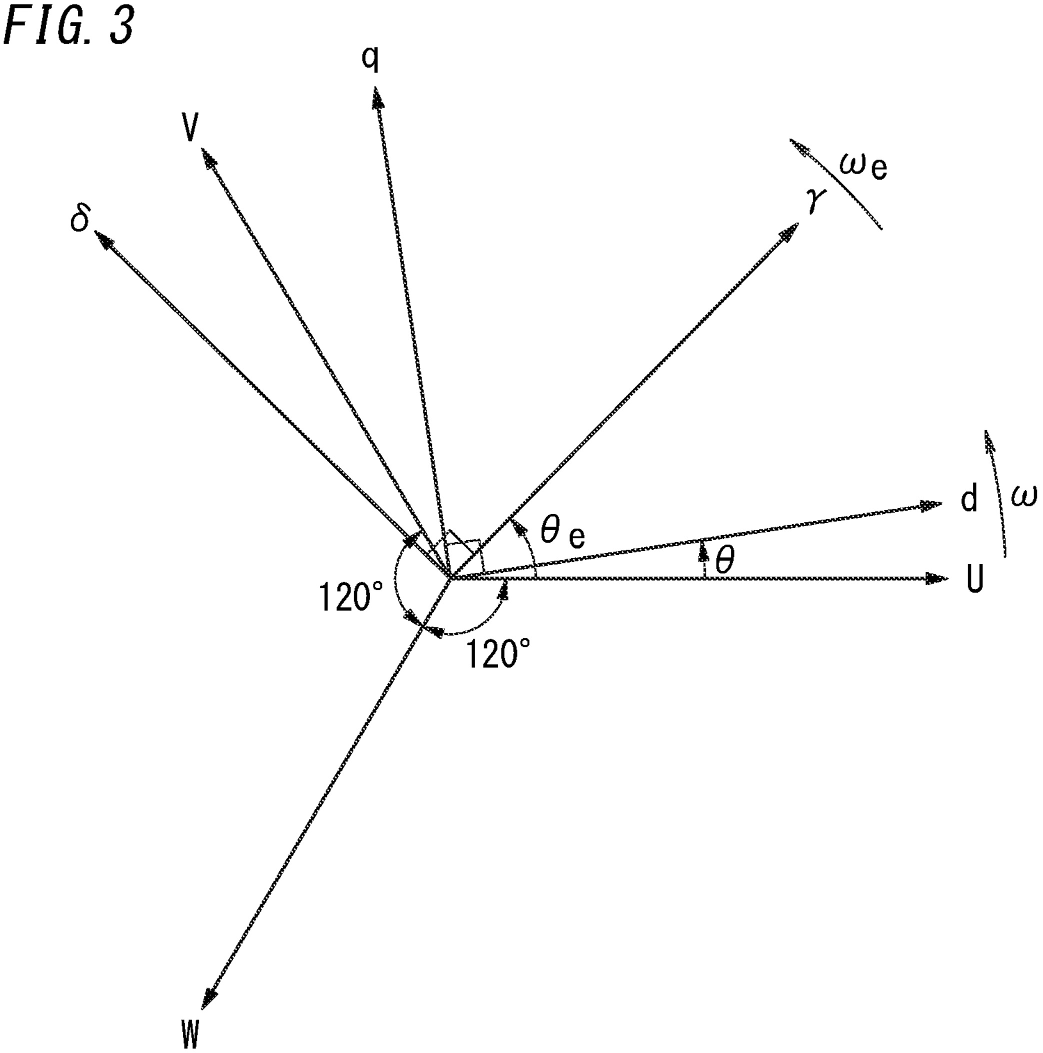
FIG. 3 illustrates how a control unit of the impact tool performs vector control.

Next, the vector control performed by the control unit 4 will be described in further detail. FIG. 3 shows an analysis model of the vector control. In FIG. 3, shown are armature winding fixed axes for the U-, V-, and W-phases. According to the vector control, a rotational coordinate system rotating at the same rotational velocity as a magnetic flux generated by the permanent magnet 131 provided for the rotor 13 of the motor 15 is taken into account. In the rotational coordinate system, the direction of the magnetic flux generated actually by the permanent magnet 131 is defined by a d-axis and a coordinate axis corresponding to the control of the motor 15 by the control unit 4 and corresponding to the d-axis is defined by a y-axis. A q-axis is set at a phase leading by an electrical angle of 90 degrees with respect to the d-axis. A δ-axis is set at a phase leading by an electrical angle of 90 degrees with respect to the y-axis.

The dq axes have rotated and their rotational velocity is designated by ω. The γδ axes have also rotated and their rotational velocity is designated by $\omega_e$. Note that $\omega_e$ in FIG. 3 corresponds with col shown in FIG. 1. Also, in the dq axes, the d-axis angle (phase) as viewed from the U-phase armature winding fixed axis is designated by θ. In the same way, in the γδ axes, the y-axis angle (phase) as viewed from the U-phase armature winding fixed axis is designated by $\theta_e$. Note that $\theta_e$ in FIG. 3 corresponds with $\theta_1$ shown in FIG. 1. The angles designated by θ and $\theta_e$ are angles as electrical angles and are generally called "rotor positions" or "magnetic pole positions." The rotational velocities designated by ω and $\omega_e$ are angular velocities represented by electrical angles.

If θ and $\theta_e$ agree with each other, the d-axis and the q-axis agree with the y-axis and the δ-axis, respectively. Basically, the control unit 4 performs the vector control such that θ and $\theta_e$ agree with each other. Thus, in a situation where the command value cid1 of the d-axis current is zero, as the load applied to the motor 15 increases or decreases, the control unit 4 performs control to compensate for the difference thus caused between θ and $\theta_e$, and therefore, the current measured value id1 of the d-axis current comes to have a positive or negative value. Specifically, right after the load applied to the motor 15 has decreased, the current measured value id1 of the d-axis current comes to have a positive value. The instant the load applied to the motor 15 increases, the current measured value id1 comes to have a negative value.

(5) Impact Detection

Figure 4:
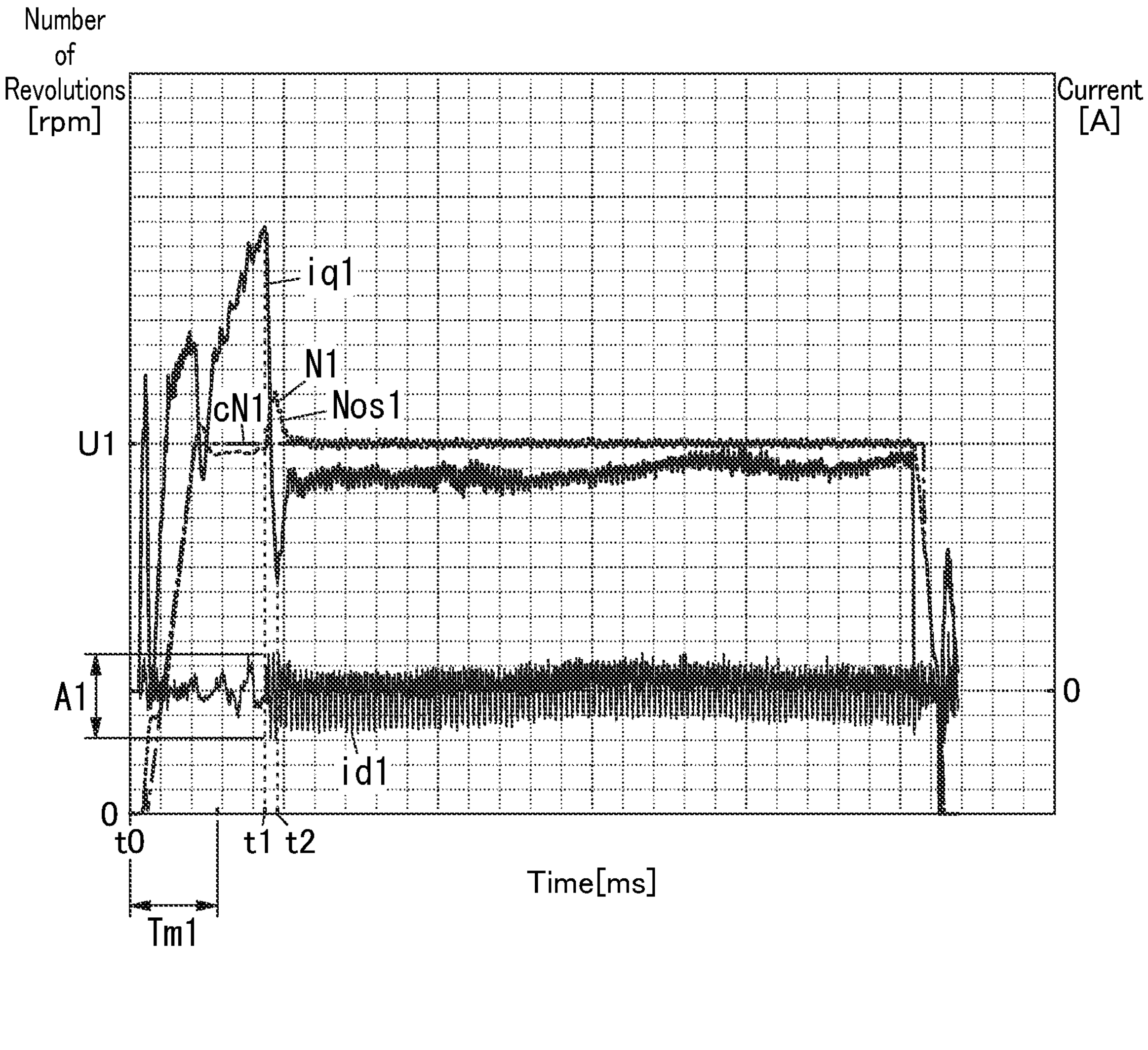
FIG. 4 is a graph showing an exemplary operation of the impact tool in a situation where the operation mode of the control unit is a second mode.
Figure 5:
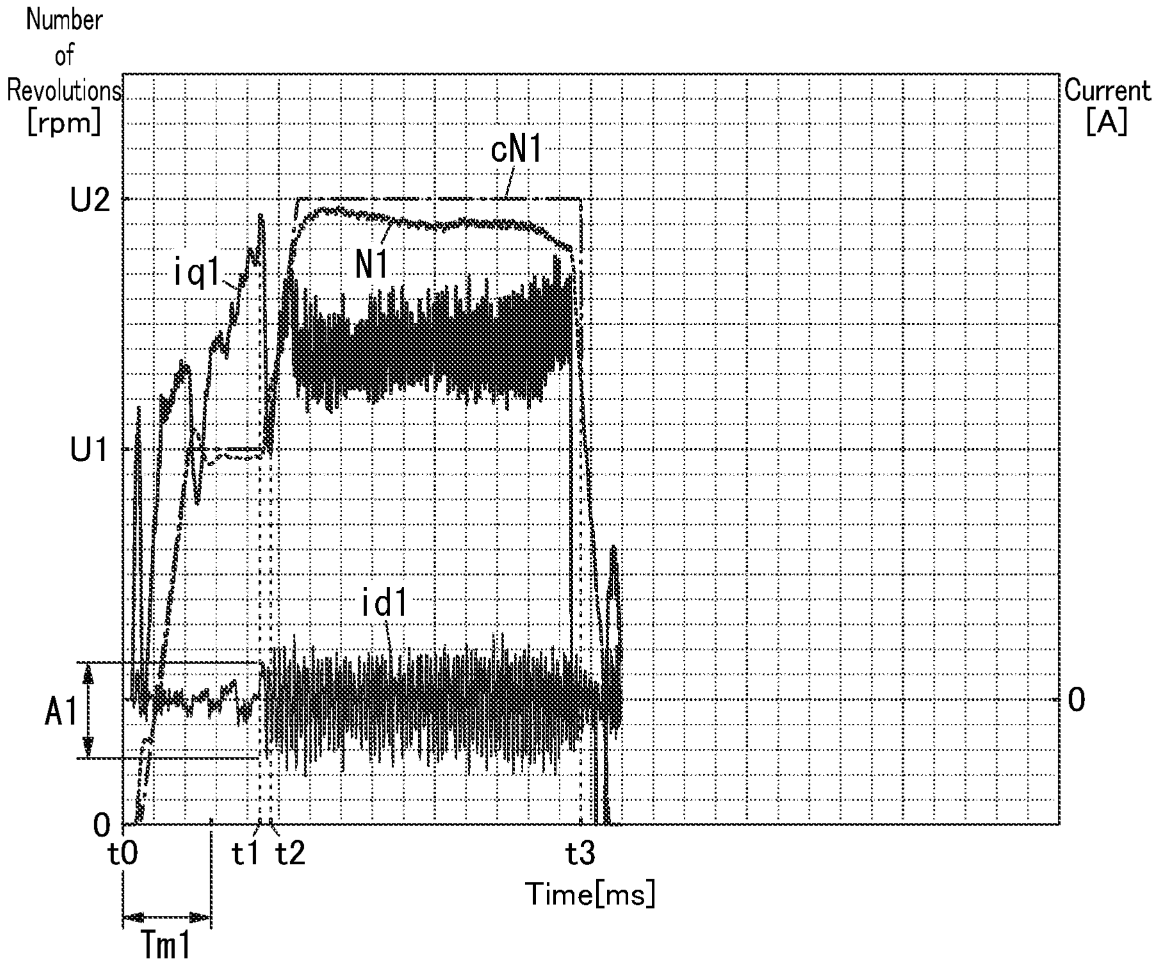
FIG. 5 is a graph showing an exemplary operation of the impact tool in a situation where the operation mode of the control unit is a first mode.

The impact mechanism 17 performs an impact operation according to the magnitude of torque applied to the output shaft 21. The impact detection unit 49 determines, based on at least one of a torque current to be supplied to the coil 141 of the motor 15 or an excitation current to be supplied to the coil 141 of the motor 15, whether or not the impact mechanism 17 is performing the impact operation. Next, it will be described with reference to FIGS. 4 and 5 how the impact detection unit 49 may determine whether or not the impact operation is being performed. In FIGS. 4 and 5, N1 indicates the number of revolutions of the (rotor 13 of the) motor 15 and cN1 indicates the command value of the number of revolutions of the motor 15. That is to say, the command value cN1 is a value obtained by converting an angular velocity command value cω1 of the motor 15 into the number of revolutions.

In this embodiment, the control unit 4 has, as mutually switchable operation modes, a first mode and a second mode. In the first mode, the control unit 4 places a limit on an increase in the number N1 of revolutions of the motor 15 before the impact detection unit 49 detects the impact operation. In addition, in the first mode, when the impact detection unit 49 detects the impact operation, the control unit 4 removes the limit on the increase in the number N1 of revolutions of the motor 15. Thus, in the second mode, the control unit 4 keeps the limit on the increase in the number N1 of revolutions of the motor 15 removed.

Therefore, the impact detection unit 49 may determine, at least when the operation mode of the control unit 4 is the first mode, whether or not the impact mechanism 17 is performing any impact operation. In the following description of an exemplary embodiment, the impact detection unit 49 is supposed to determine, irrespective of the operation mode of the control unit 4, whether or not the impact mechanism 17 is performing the impact operation. FIG. 4 is a graph showing the results obtained when the operation mode of the control unit 4 is the second mode. FIG. 5 is a graph showing the results obtained when the operation mode of the control unit 4 is the first mode.

Note that the impact tool 1 includes a first user interface for accepting the user's operating command, for example. The first user interface may be, for example, a button, a slide switch, or a touchscreen panel. In accordance with the user's operating command entered through the first user interface, the control unit 4 switches the operation mode from the first mode to the second mode, and vice versa. For example, the user sets the operation mode of the control unit 4 at the first mode if the fastening member 30 is a wood screw and sets the operation mode of the control unit 4 at the second mode otherwise.

Optionally, the first user interface may display some marker representing a wood screw at a location where switch to the first mode is supposed to be made. Examples of such markers include a character string such as "wood screw" or "wood screw mode" or an icon, picture, or photograph representing a wood screw. Such a marker may be provided on a mechanical button or a button displayed on the screen of the touchscreen panel for use to switch the operation mode to the first mode. Alternatively, the marker may also be provided beside the button. Still alternatively, the marker may also be provided beside the location of a slide switch when the operation mode is the first mode.

The impact detection unit 49 determines, based on at least one of a current measured value id1 of an excitation current or a current measured value iq1 of a torque current, whether or not any impact operation is being performed. In this embodiment, the impact detection unit 49 determines, based on both the current measured values id1, iq1, whether or not the impact operation is being performed.

More specifically, as for the current measured value id1, the impact detection unit 49 determines whether or not the following first condition is satisfied. The first condition is that the amplitude of the current measured value id1 be greater than a predetermined d-axis threshold value. The amplitude of the current measured value id1 is herein defined to be a half of the difference between the maximum and minimum values per unit time of the current measured value id1, for example. The impact detection unit 49 may determine, for example, every time a predetermined unit time passes, whether or not the first condition is satisfied. The amplitude A1 shown in FIGS. 4 and 5 is double the amplitude of the current measured value id1 which is defined by the current measured values id1 at respective points in time until the predetermined unit time (of a few milliseconds to several ten milliseconds, for example) passes since a certain point in time t1.

In this manner, the impact detection unit 49 determines, based on the amplitude of the current measured value id1 (of excitation current), whether or not the impact operation is being performed.

On the other hand, as for the current measured value iq1, the impact detection unit 49 determines whether or not the following second condition is satisfied. The second condition is that the magnitude of decrease per unit time (of several ten milliseconds, for example) in the current measured value iq1 be greater than a predetermined q-axis threshold value. The impact detection unit 49 may determine, for example, every time the predetermined time passes, whether or not the second condition is satisfied.

In this manner, the impact detection unit 49 determines, based on the magnitude of decrease per predetermined time in the current measured value iq1 (of a torque current), whether or not the impact operation is being performed.

When finding the interval between a point in time when one of the first and second conditions is satisfied and a point in time when the other condition is satisfied equal to or less than a predetermined time threshold value, for example, the impact detection unit 49 outputs a result of detection indicating that the impact mechanism 17 is performing the impact operation. Otherwise, the impact detection unit 49 outputs a result of detection indicating that the impact mechanism 17 is not performing the impact operation.

That is to say, the load applied to the motor 15 increases and decreases incessantly. Once the impact operation has started to be performed, the magnitude of the increase or decrease in the load applied to the motor 15 rises, thus widening the difference between θ and θe and causing an increase in the amplitude of the current measured value id1 of the excitation current. In addition, once the impact operation has started to be performed, the load applied to the motor 15 falls while repeatedly increasing and decreasing, thus causing a decrease in the current measured value iq1 of the torque current. The impact detection unit 49 determines, by seeing based on the first and second conditions if any such change has occurred, whether or not the impact operation is being performed.

Threshold values such as the d-axis threshold value and the q-axis threshold value may be stored in advance in, for example, a memory of a microcontroller serving as the control unit 4.

Note that it is not until a predetermined mask period Tm1 has passed since the motor 15 started (started running) that the impact detection unit 49 starts determining whether or not the impact mechanism 17 is performing any impact operation. This may reduce the chances of the impact detection unit 49 detecting the impact operation erroneously during the mask period Tm1.

In FIG. 4, after the motor 15 has started running at a point in time t0, the impact mechanism 17 starts performing the impact operation at a point in time t1. Once the impact operation has started to be performed, the amplitude of the current measured value id1 increases from the point in time t1 on. Meanwhile, the current measured value iq1 decreases from the point in time t1 through a point in time t2. In at least a part of the interval between the points in time t1 and t2, the impact detection unit 49 may detect, based on the first and second conditions, the impact operation. In FIG. 4, the operation mode of the control unit 4 is the second mode, and therefore, the control of the motor 15 by the control unit 4 is not affected, no matter whether the impact operation is detected or not.

In FIG. 5, as well as in FIG. 4, after the motor 15 has started running at a point in time t0, the impact mechanism 17 starts performing the impact operation at a point in time t1. Next, at a point in time t2 following the point in time t1, the impact detection unit 49 outputs a result of detection indicating that the impact mechanism 17 is performing an impact operation.

FIG. 5 is a graph showing the results of detection obtained when the operation mode of the control unit 4 is the first mode. In the first mode, the control unit 4 places a limit on the increase in the number N1 of revolutions of the motor 15 before the impact detection unit 49 detects the impact operation. Specifically, before the impact detection unit 49 detects the impact operation (i.e., from the point in time t0 through the point in time t2), the command value cN1 of the number N1 of revolutions of the motor 15 is equal to or less than an upper limit value U1. More specifically, when the user pulls the trigger switch 29 to the maximum depth, the command value cN1 becomes equal to the upper limit value U1. This allows the control unit 4 to limit the number N1 of revolutions of the motor 15 to a predetermined upper limit value U1 or less before the impact detection unit 49 detects the impact operation. That is to say, at this time, the control unit 4 places a limit on the increase in the number N1 of revolutions of the motor 15. As used herein, "limiting the number N1 of revolutions of the motor 15 to the predetermined upper limit value U1 or less" only requires that the number N1 of revolutions be equal to or less than the upper limit value U1 at least in a steady state. Thus, the number N1 of revolutions may temporarily exceed the upper limit value U1. For example, immediately after the number N1 of revolutions increasing has reached the upper limit value U1, the number N1 of revolutions may exceed the upper limit value U1 just temporarily as shown in FIG. 5.

When the impact detection unit 49 detects the impact operation, the control unit 4 allows the number N1 of revolutions of the motor 15 to exceed the upper limit value U1 according to the manipulative variable of the trigger switch 29 (i.e., depending on how deep the trigger switch 29 has been pulled). Thus, the control unit 4 removes the limit on the increase in the number N1 of revolutions of the motor 15. More specifically, when the impact detection unit 49 detects the impact operation, the control unit 4 updates the state where the command value cN1 of the number N1 of revolutions of the motor 15 is limited to the upper limit value U1 or less into a state where the command value cN1 of the number N1 of revolutions of the motor 15 is limited to another limit value U2 or less, where the limit value U2 is greater than the upper limit value U1. In this manner, the control unit 4 lifts the restriction that the number N1 of revolutions of the motor 15 should not increase to exceed the upper limit value U1. In the state where the control unit 4 limits the command value cN1 to the limit value U2 or less, when the user pulls the trigger switch 29 to the maximum depth, the command value cN1 becomes equal to the limit value U2.

Specifically, the upper limit value U1 and the limit value U2 may be 15000 rpm and 25000 rpm, respectively. Alternatively, the upper limit value U1 and the limit value U2 may also be 21000 rpm and 24000 rpm, respectively.

In the first mode, the number N1 of revolutions of the motor 15 may be kept lower, no matter how deep the trigger switch 29 is pulled, than in a situation where the command value cN1 of the number N1 of revolutions of the motor 15 is limited to the limit value U2 or less from the beginning. This makes it easier to stabilize the orientation of the fastening member 30 before the impact operation is started. If the fastening member 30 is a wood screw, for example, then the number N1 of revolutions may be kept relatively low until a tip part of the fastening member 30 is screwed to a certain depth or more into a target member (such as a wall member) into which the fastening member 30 should be screwed. Consequently, this makes it easier to stabilize the orientation of the fastening member 30.

In addition, keeping the number N1 of revolutions of the motor 15 relatively low may also reduce the chances of causing a "come out" phenomenon. As used herein, the "come out" phenomenon refers to an unintentional disengagement of the tip tool 28 out of the fastening member 30 while the motor 15 is running (rotating). That is to say, if the tip portion 280 of the tip tool 28 which has been inserted into the screw hole of the fastening member 30 has come out of the screw hole while the motor 15 is running (rotating), then the "come out" phenomenon has occurred.

In addition, the first mode also enables having the work done in a shorter time since the impact operation has been started, compared to a situation where the command value cN1 of the number N1 of revolutions of the motor 15 is kept limited to the upper limit value U1 or less as shown in FIG. 4.

(6) Exemplary Operation from Start Through Stop of Running

Next, an exemplary operation of the impact tool 1 in a situation where the operation mode of the control unit 4 is the first mode will be described with reference to FIG. 5.

At a point in time t0, the user pulls the trigger switch 29 to cause the motor 15 to start running. When the motor 15 starts running, the command value cN1 of the number N1 of revolutions of the motor 15 is limited to the upper limit value U1 or less. After the mask period Tm1 has passed since the motor 15 started running, the impact mechanism 17 starts performing the impact operation at a point in time t1.

Next, at a point in time t2, the impact detection unit 49 outputs a result of detection indicating that the impact mechanism 17 is performing the impact operation. Then, the control unit 4 updates the state where the command value cN1 of the number N1 of revolutions of the motor 15 is limited to the upper limit value U1 or less into a state where the command value cN1 of the number N1 of revolutions of the motor 15 is limited to another limit value U2 or less. From this point in time t2 on, the command value cN1 will be kept limited to the limit value U2 or less until the motor 15 stops running.

In this case, if the user has pulled the trigger switch 29 to the maximum depth, then the command value cN1 will increase to the limit value U2 from the point in time t2 on, thus causing an increase in the number N1 of revolutions.

Then, at a point in time t3, the work of tightening the fastening member 30 is finished. That is to say, the fastening member 30 is screwed fully at the point in time t3. Thus, at the point in time t3, the user stops performing the operation of pulling the trigger switch 29. As a result, the command value cN1 decreases to 0 rpm, and therefore, the number N1 of revolutions goes 0 rpm. That is to say, the motor 15 stops running.

(First Variation)

Next, an impact tool 1 according to a first variation will be described. In the following description, any constituent element of this first variation, having the same function as a counterpart of the embodiment described above, will be designated by the same reference numeral as that counterpart's, and description thereof will be omitted herein.

When the impact detection unit 49 detects the impact operation, the control unit 4 may not only lift the restriction that the command value cN1 of the number N1 of revolutions should be equal to or less than the upper limit value U1 but also increase the command value cN1 as well. That is to say, the control unit 4 increases the number N1 of revolutions indirectly by increasing the command value cN1.

For example, from a point in time when the impact detection unit 49 detects the impact operation, the control unit 4 may determine the command value cN1 provisionally depending on how deep the trigger switch 29 has been pulled and then increase the command value cN1. More specifically, the command value generating unit 41 of the control unit 4 increases the command value cN1 of the number N1 of revolutions substantially by increasing the command value cω1 of the angular velocity.

Optionally, the control unit 4 may determine the number N1 of revolutions that has been increased based on the number N1 of revolutions that has not been increased yet. For example, when the impact detection unit 49 detects the impact operation, the control unit 4 may calculate a new command value cN1 by multiplying the command value cN1 at the point in time when the impact detection unit 49 detects the impact operation by a predetermined first value which is greater than one (e.g., 1.2). Alternatively, when the impact detection unit 49 detects the impact operation, the control unit 4 may calculate a new command value cN1 by adding a predetermined second value (e.g., 2000 rpm) to the command value cN1 at the point in time when the impact detection unit 49 detects the impact operation. Nevertheless, the control unit 4 adjusts the predetermined first or second value as appropriate such that the command value cN1 becomes equal to or less than the limit value U2.

Still alternatively, when the impact detection unit 49 detects the impact operation, the control unit 4 may set a setting as a new command value cN1. The setting is a value greater than the upper limit value U1 and equal to or less than the limit value U2. That is to say, when the impact detection unit 49 detects the impact operation, the control unit 4 may set the command value cN1 at a predetermined value, and thereby set the number N1 of revolutions at a predetermined number of revolutions.

This first variation enables, even when the trigger switch 29 has been pulled relatively shallowly, increasing the command value cN1 and the number N1 of revolutions.

(Second Variation)

Next, an impact tool 1 according to a second variation will be described. In the following description, any constituent element of this second variation, having the same function as a counterpart of the embodiment described above, will be designated by the same reference numeral as that counterpart's, and description thereof will be omitted herein.

The control unit 4 may control the number N1 of revolutions of the motor 15 toward a predetermined number of revolutions, no matter how deep the trigger switch 29 has been pulled. For example, in the interval between a point in time when the motor 15 started running in response to pulling of the trigger switch 29 and a point in time when the impact detection unit 49 detects the impact operation, the control unit 4 sets the command value cN1 of the number N1 of revolutions at a value equal to the upper limit value U1, thus reducing the chances of the number N1 of revolutions increasing to exceed the upper limit value U1. Also, when the impact detection unit 49 detects the impact operation, for example, the control unit 4 may set the command value cN1 at a value equal to the limit value U2. Thereafter, when the user stops pulling the trigger switch 29, the control unit 4 sets the command value cN1 at 0 rpm.

This second variation makes the number N1 of revolutions of the motor 15 controllable without depending on the user's skill.

Other Variations of the Embodiment

Next, other variations of the embodiment described above will be enumerated one after another. Optionally, the variations to be described below may be adopted in combination as appropriate. Alternatively, any of the variations to be described below may be combined as appropriate with any of the variations described above.

The functions of the impact tool 1 may also be implemented as, for example, a method for controlling the impact tool 1, a (computer) program, or a non-transitory storage medium that stores the program thereon.

A method for controlling an impact tool 1 according to an aspect includes impact detection processing, a first control, and a second control. The impact detection processing includes determining, based on at least one of an excitation current (current measured value id1) to be supplied to the motor 15 or a torque current (current measured value iq1) to be supplied to the motor 15, whether or not any impact operation is being performed. The first control includes placing a limit on an increase in the number N1 of revolutions of the motor 15 before the impact operation is detected in the impact detection processing. The second control includes removing the limit on the increase in the number N1 of revolutions of the motor 15 when the impact operation is detected in the impact detection processing.

Figure 6:
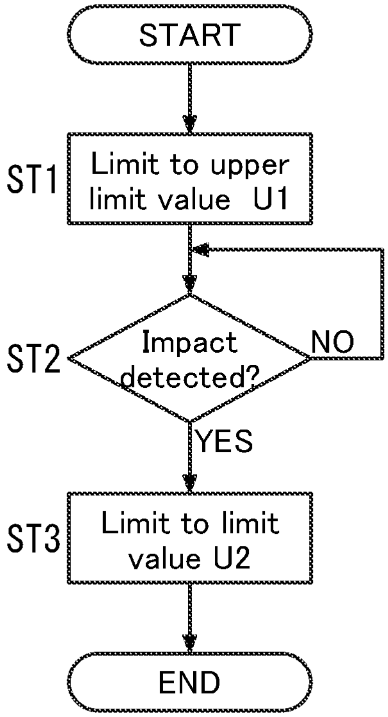
FIG. 6 is a flowchart showing a method for controlling the impact tool.

Specifically, as shown in FIG. 6, the control unit 4 first performs the first control to limit the command value cN1 of the number N1 of revolutions of the motor 15 to an upper limit value U1 or less (in Step ST1), thereby placing a limit on the increase in the number N1 of revolutions of the motor 15. Next, the impact detection unit 49 determines whether or not the impact mechanism 17 is performing any impact operation (in Step ST2). When the impact detection unit 49 detects any impact operation (if the answer is YES in Step ST2), the control unit 4 updates the state where the command value cN1 of the number N1 of revolutions of the motor 15 is limited to the upper limit value U1 or less into a state where the command value cN1 of the number N1 of revolutions of the motor 15 is limited to a limit value U2 or less (in Step ST3). That is to say, the control unit 4 lifts the restriction that the number N1 of revolutions of the motor 15 should not increase to exceed the upper limit value U1.

A program according to another aspect is designed to cause one or more processors to perform the method for controlling the impact tool 1 described above.

The impact tool 1 according to the present disclosure includes a computer system. The computer system may include, as principal hardware components, a processor and a memory. Some of the functions of the impact tool 1 according to the present disclosure may be performed by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be made up of a single or a plurality of electronic circuits including a semiconductor integrated circuit (IC) or a large-scale integrated circuit (LSI). As used herein, the "integrated circuit" such as an IC or an LSI is called by a different name depending on the degree of integration thereof. Examples of the integrated circuits include a system LSI, a very-large-scale integrated circuit (VLSI), and an ultra-large-scale integrated circuit (ULSI). Optionally, a field-programmable gate array (FPGA) to be programmed after an LSI has been fabricated or a reconfigurable logic device allowing the connections or circuit sections inside of an LSI to be reconfigured may also be adopted as the processor. Those electronic circuits may be either integrated together on a single chip or distributed on multiple chips, whichever is appropriate. Those multiple chips may be aggregated together in a single device or distributed in multiple devices without limitation. As used herein, the "computer system" includes a microcontroller including one or more processors and one or more memories. Thus, the microcontroller may also be implemented as a single or a plurality of electronic circuits including a semiconductor integrated circuit or a large-scale integrated circuit.

Also, in the embodiment described above, the plurality of functions of the impact tool 1 are integrated together in a single housing. However, this is not an essential configuration for the impact tool 1. Alternatively, those constituent elements of the impact tool 1 may be distributed in multiple different housings. Still alternatively, at least some functions of the impact tool 1 (e.g., some functions of the impact detection unit 49) may be implemented as a cloud computing system as well.

The motor 15 may be an AC motor or a DC motor, whichever is appropriate.

The tip tool 28 does not have to be counted among the constituent elements of the impact tool 1.

The tip tool 28 does not have to be a + (plus) screwdriver bit but may also be a − (minus) screwdriver bit. Alternatively, the tip tool 28 may even be a Torx® bit or a wrench bit.

The impact detection unit 49 may be provided separately from the control unit 4. That is to say, a constituent element performing the control unit's 4 function of performing the vector control on the motor 15 and a constituent element performing the impact detection unit's 49 function of determining whether or not any impact operation is being performed may be provided separately from each other.

The motor rotation measuring unit 27 may be replaced with an acceleration sensor for measuring either the angular acceleration or circumferential acceleration of the rotary shaft 16 of the motor 15.

The control unit 4 may have the function of changing at least one of the upper limit value U1 or the limit value U2. The impact tool 1 may include a second user interface for accepting the user's operating command, for example. The second user interface may be, for example, a button, a slide switch, or a touchscreen panel. In accordance with the user's operating command entered through the second user interface, the control unit 4 changes at least one of the upper limit value U1 or the limit value U2. Alternatively, the impact tool 1 may also include a reception unit for accepting a signal that has been input, for example. The reception unit receives the signal from an external device outside of the impact tool 1. In response to the signal, the control unit 4 changes at least one of the upper limit value U1 or the limit value U2. The communication between the external device and the reception unit may be either wireless communication or wired communication, whichever is appropriate. Optionally, at least some constituent elements may be used in common between the second user interface and the first user interface.

When finding at least one of the first condition about the current measured value id1 or the second condition about the current measured value iq1 satisfied, the impact detection unit 49 may output a result of detection indicating that the impact mechanism 17 is performing the impact operation. Optionally, the impact detection unit 49 may determine, based on only the first condition, whether or not the impact operation is being performed. Alternatively, the impact detection unit 49 may determine, based on only the second condition, whether or not the impact operation is being performed.

Furthermore, the impact detection unit 49 may also use, as the second condition, a condition about the absolute value of the current measured value iq1. For example, the second condition defined by the impact detection unit 49 may be that the absolute value of the current measured value iq1 (instantaneous value) be greater than a predetermined threshold value. Then, when finding the first condition satisfied after the second condition has been satisfied, the impact detection unit 49 may output a result of detection indicating that the impact mechanism 17 is performing the impact operation. Alternatively, when finding the interval between a point in time when one of the first and second conditions is satisfied and a point in time when the other condition is satisfied equal to or less than a predetermined time threshold value, for example, the impact detection unit 49 may output a result of detection indicating that the impact mechanism 17 is performing the impact operation.

Still alternatively, the second condition defined by the impact detection unit 49 may also be that the absolute value of the current measured value iq1 have exceeded a predetermined threshold value and then the magnitude of decrease per predetermined time in the current measured value iq1 be greater than a predetermined q-axis threshold value. Then, when finding the interval between a point in time when one of the first and second conditions is satisfied and a point in time when the other condition is satisfied equal to or less than a predetermined time threshold value, for example, the impact detection unit 49 may output a result of detection indicating that the impact mechanism 17 is performing the impact operation.

As can be seen, the impact detection unit 49 may determine, based on at least one of the absolute value of the current measured value iq1 (of torque current) or the magnitude of decrease per predetermined time in the current measured value iq1 (of torque current), whether or not the impact operation is being performed.

Still alternatively, the impact detection unit 49 may also determine, based on not only at least one of the current measured values id1, iq1 but also the number N1 of revolutions of the motor 15, whether or not the impact operation is being performed. That is to say, the impact detection unit 49 may determine, based on not only at least one of the first and second conditions but also the following third condition, whether or not the impact operation is being performed. Specifically, the third condition is that the number N1 of revolutions of the motor 15 overshoot. In other words, the third condition is that an overshoot waveform Nos 1 (see FIG. 4) be observed in the waveform representing the number N1 of revolutions of the motor 15. As used herein, the "overshoot" means that a measured value is greater than a command value to a predetermined degree or more. Specifically, in FIG. 4, once the impact mechanism 17 has started performing the impact operation at the point in time t1, the load applied to the motor 15 falls while repeatedly increasing and decreasing. Thus, the number N1 of revolutions temporarily increases to exceed the command value cN1. When the difference between the number N1 of revolutions and the command value cN1 becomes equal to or greater than a predetermined magnitude, the impact detection unit 49 decides that the third condition should be satisfied. When finding the first, second, and third conditions all satisfied within a predetermined period of time, for example, the impact detection unit 49 outputs a result of detection indicating that the impact mechanism 17 is performing the impact operation.

Optionally, the impact detection unit 49 may determine, based on the command value ciq1 instead of the current measured value iq1 of torque current, whether or not the impact operation is being performed. That is to say, in the exemplary embodiment and its variations described above, when a determination is made whether or not the impact operation is being performed, the current measured value iq1 may be replaced with the command value ciq1.

(Recapitulation)

The embodiment and its variations described above may be specific implementations of the following aspects of the present disclosure.

An impact tool (1) according to a first aspect includes a motor (15), a control unit (4), an output shaft (21), a transmission mechanism (18), and an impact detection unit (49). The control unit (4) performs vector control on the motor (15). The output shaft (21) is to be coupled to a tip tool (28). The transmission mechanism (18) transmits motive power of the motor (15) to the output shaft (21). The transmission mechanism (18) includes an impact mechanism (17). The impact mechanism (17) performs an impact operation according to magnitude of torque applied to the output shaft (21). The impact mechanism (17) applies impacting force to the output shaft (21) while performing the impact operation. The impact detection unit (49) determines, based on at least one of an excitation current (current measured value id1) to be supplied to the motor (15) or a torque current (current measured value iq1) to be supplied to the motor (15), whether or not the impact operation is being performed. The control unit (4) places a limit on an increase in a number (N1) of revolutions of the motor (15) before the impact detection unit (49) detects the impact operation and removes the limit on the increase in the number (N1) of revolutions of the motor (15) when the impact detection unit (49) detects the impact operation.

According to this configuration, a limit is placed on an increase in the number (N1) of revolutions of the motor (15) before the impact mechanism (17) starts performing the impact operation, thus reducing the chances of a work target such as a screw being tilted with respect to a workpiece such a wall due to an excessive number (N1) of revolutions and thereby improving the work efficiency. In addition, this also allows the number (N1) of revolutions of the motor (15) to be increased once the impact mechanism (17) has started performing the impact operation, thus contributing to improving the work efficiency compared to a situation where the number (N1) of revolutions cannot be increased.

In an impact tool (1) according to a second aspect, which may be implemented in conjunction with the first aspect, the impact detection unit (49) determines, based on an amplitude of the excitation current (current measured value id1), whether or not the impact operation is being performed.

This configuration allows the impact detection unit (49) to determine whether or not any impact operation is being performed.

In an impact tool (1) according to a third aspect, which may be implemented in conjunction with the first or second aspect, the impact detection unit (49) determines, based on at least one of an absolute value of the torque current (current measured value iq1) or magnitude of decrease per predetermined time in the torque current, whether or not the impact operation is being performed.

This configuration allows the impact detection unit (49) to determine whether or not any impact operation is being performed.

An impact tool (1) according to a fourth aspect, which may be implemented in conjunction with any one of the first to third aspects, further includes a trigger switch (29) to accept a user's operating command. The control unit (4) limits the number (N1) of revolutions of the motor (15) to a predetermined upper limit value (U1) or less before the impact detection unit (49) detects the impact operation and allows the number (N1) of revolutions of the motor (15) to exceed the upper limit value (U1) according to a manipulative variable of the trigger switch (29) when the impact detection unit (49) detects the impact operation.

This configuration allows the number (N1) of revolutions of the motor (15) to be increased in accordance with the user's operating command after the impact operation has started to be performed.

In an impact tool (1) according to a fifth aspect, which may be implemented in conjunction with any one of the first to fourth aspects, the control unit (4) increases the number (N1) of revolutions of the motor (15) when the impact detection unit (49) detects the impact operation.

This configuration allows the number (N1) of revolutions of the motor (15) to be increased without the user's operation after the impact operation has started to be performed.

In an impact tool (1) according to a sixth aspect, which may be implemented in conjunction with the fifth aspect, the control unit (4) sets the number (N1) of revolutions of the motor (15) at a predetermined number of revolutions when the impact detection unit (49) detects the impact operation.

This configuration enables setting the number (N1) of revolutions of the motor (15) at an appropriate value without depending on the user's skill of operating the impact tool (1) after the impact operation has started to be performed.

In an impact tool (1) according to a seventh aspect, which may be implemented in conjunction with any one of the first to sixth aspects, the control unit (4) has, as mutually switchable operation modes, a first mode and a second mode. In the first mode, the control unit (4) places the limit on the increase in the number (N1) of revolutions of the motor (15) before the impact detection unit (49) detects the impact operation. In the second mode, the control unit (4) keeps the limit on the increase in the number (N1) of revolutions of the motor (15) removed.

This configuration enables selectively placing, depending on the necessity, a limit on the increase in the number (N1) of revolutions of the motor (15).

Note that the constituent elements according to the second to seventh aspects are not essential constituent elements for the impact tool (1) but may be omitted as appropriate.

A method for controlling an impact tool (1) according to an eighth aspect is a method for controlling an impact tool (1) including a motor (15), a control unit (4), an output shaft (21), and a transmission mechanism (18). The control unit (4) performs vector control on the motor (15). The output shaft (21) is to be coupled to a tip tool (28). The transmission mechanism (18) transmits motive power of the motor (15) to the output shaft (21). The transmission mechanism (18) includes an impact mechanism (17). The impact mechanism (17) performs an impact operation according to magnitude of torque applied to the output shaft (21). The impact mechanism (17) applies impacting force to the output shaft (21) while performing the impact operation. The method for controlling the impact tool (1) includes impact detection processing, a first control, and a second control. The impact detection processing includes determining, based on at least one of an excitation current (current measured value id1) to be supplied to the motor (15) or a torque current (current measured value iq1) to be supplied to the motor (15), whether or not the impact operation is being performed. The first control includes placing a limit on an increase in a number (N1) of revolutions of the motor (15) before the impact operation is detected in the impact detection processing. The second control includes removing the limit on the increase in the number (N1) of revolutions of the motor (15) when the impact operation is detected in the impact detection processing.

This method enables improving the work efficiency.

A program according to a ninth aspect is designed to cause one or more processors to perform the method for controlling the impact tool (1) according to the eighth aspect.

This program enables improving the work efficiency.

Note that these are not the only aspects of the present disclosure. Rather, various configurations (including variations) of the impact tool (1) according to the exemplary embodiment described above may also be implemented as a method for controlling the impact tool (1) or a program.

REFERENCE SIGNS LIST

1 Impact Tool
4 Control Unit
15 Motor
17 Impact Mechanism
18 Transmission Mechanism
21 Output Shaft
28 Tip Tool
29 Trigger Switch
49 Impact Detection Unit id1 Current Measured Value (Excitation Current)
iq1 Current Measured Value (Torque Current)
N1 Number of Revolutions
U1 Upper Limit Value

The invention claimed is:

1. An impact tool comprising:

a motor;

a control unit configured to perform vector control on the motor;

an output shaft configured to be coupled to a tip tool;

a transmission mechanism including an impact mechanism and configured to transmit motive power of the motor to the output shaft, the impact mechanism being configured to perform an impact operation of applying impacting force to the output shaft according to magnitude of torque applied to the output shaft; and an impact detection unit configured to determine, based on at least one of an excitation current to be supplied to the motor or a torque current to be supplied to the motor, whether or not the impact operation is being performed, the control unit being configured to place a limit on an increase in a number of revolutions of the motor before the impact detection unit detects the impact operation and remove the limit on the increase in the number of revolutions of the motor when the impact detection unit detects the impact operation.

2. The impact tool of claim 1, wherein the impact detection unit is configured to determine, based on an amplitude of the excitation current, whether or not the impact operation is being performed.

3. The impact tool of claim 1, wherein the impact detection unit is configured to determine, based on at least one of an absolute value of the torque current or magnitude of decrease per predetermined time in the torque current, whether or not the impact operation is being performed.

4. The impact tool of claim 1, comprising a trigger switch configured to accept a user's operating command, wherein the control unit is configured to limit the number of revolutions of the motor to a predetermined upper limit value or less before the impact detection unit detects the impact operation and allow the number of revolutions of the motor to exceed the upper limit value according to a manipulative variable of the trigger switch when the impact detection unit detects the impact operation.

5. The impact tool of claim 1, wherein the control unit is configured to increase the number of revolutions of the motor when the impact detection unit detects the impact operation.

6. The impact tool of claim 5, wherein the control unit is configured to set the number of revolutions of the motor at a predetermined number of revolutions when the impact detection unit detects the impact operation.

7. The impact tool of claim 1, wherein the control unit has, as mutually switchable operation modes, a first mode in which the control unit places the limit on the increase in the number of revolutions of the motor before the impact detection unit detects the impact operation and a second mode in which the control unit keeps the limit removed.

8. A method for controlling an impact tool, the impact tool including:

a motor;

a control unit configured to perform vector control on the motor;

an output shaft configured to be coupled to a tip tool; and a transmission mechanism including an impact mechanism and configured to transmit motive power of the motor to the output shaft, the impact mechanism being configured to perform an impact operation of applying impacting force to the output shaft according to magnitude of torque applied to the output shaft, the method including:

impact detection processing including determining, based on at least one of an excitation current to be supplied to the motor or a torque current to be supplied to the motor, whether or not the impact operation is being performed, a first control including placing a limit on an increase in a number of revolutions of the motor before the impact operation is detected in the impact detection processing; and a second control including removing the limit on the increase in the number of revolutions of the motor when the impact operation is detected in the impact detection processing.

9. A non-transitory computer-readable storage medium having stored thereon a program designed to cause one or more processors of the computer to perform the method for controlling the impact tool according to claim 8.

* * * * *